United States Patent [19]

Patel

[11] Patent Number: 5,053,615

[45] Date of Patent: Oct. 1, 1991

[54] CORRECTION ALGORITHM FOR CONTIGUOUS CCD ELEMENTS LEAKAGE

[75] Inventor: Chandrakant B. Patel, Hopewell, N.J.

[73] Assignee: SamSung Electronics Co., Ltd., Kyung Ki-Do, Rep. of Korea

[21] Appl. No.: 505,479

[22] Filed: Apr. 6, 1990

[51] Int. Cl.$^5$ ............................................. H01J 40/14
[52] U.S. Cl. ............................... 250/208.1; 358/213.24
[58] Field of Search ................ 250/208.1; 358/213.24; 364/726

[56] References Cited

U.S. PATENT DOCUMENTS

| | | |
|---|---|---|
| 4,010,319 | 3/1977 | Levine . |
| 4,167,755 | 9/1979 | Nagumo . |
| 4,345,148 | 8/1982 | Pines et al. . |
| 4,442,454 | 4/1984 | Powell . |
| 4,543,610 | 9/1985 | Ozawa et al. . |
| 4,558,366 | 12/1985 | Nagumo . |
| 4,605,969 | 8/1986 | Green . |
| 4,626,902 | 12/1986 | Yamada . |
| 4,628,211 | 12/1986 | Ruppert . |
| 4,639,775 | 1/1987 | Cohen et al. ................ 358/213.24 |
| 4,736,439 | 5/1988 | May . |
| 4,768,098 | 8/1988 | Vogelsong . |
| 4,805,031 | 2/1989 | Powell . |
| 4,864,407 | 9/1989 | Mulder ........................ 358/213.24 |
| 4,951,148 | 8/1990 | Esser et al. .................. 358/213.24 |

*Primary Examiner*—David C. Nelms
*Assistant Examiner*—Khaled Shami
*Attorney, Agent, or Firm*—Robert E. Bushnell

[57] ABSTRACT

A row scanner (24) sequentially reads signals derived from charges on an array (10) of photosensitive elements disposed in rows and columns, and serially applied the resulting signals to a finite impulse filter (30). Within the finite impulse filter (30), the resulting signal serially read are added to provide intermediate signals corresponding to photosensitive elements equal distantly spaced from the one photosensitive element considered, and the sums of those intermediate signals are corrected by factors either measured or empirically determined for the photosensitive elements within each circle to provide a plurality of correction signals. The correction signals are accumulatively subtracted from the uncorrected resulting image signal read from the photosensitive element considered, to provide a final image signal corrected for undesired contributions due to leakage from neighboring photosensitive elements in a plurality of circles of photosensitive elements of increasing radius.

14 Claims, 2 Drawing Sheets

FIG. 1

FIG. 2

CORRECTION ALGORITHM FOR CONTIGUOUS CCD ELEMENTS LEAKAGE

BACKGROUND OF THE INVENTION

1. Field of the Invention

This invention related to optical information sensing and, more particularly, to circuits and processes for attenuating smearing of video information due to leakage between individual light sensing elements and elements contiguously and proximally positioned around each of the elements.

2. Description of the Art

The total energy received by charge coupled device (CCD) image sensors can cause leakage or contamination in the horizontal direction only for a single array of CCD elements. When the CCD elements are arranged in the rows and columns, the leakage will be in both horizontal and vertical directions. As used herein, "leakage" means the contribution to the contamination of an electrical signal generated by one CCD element in response to energy impingement on the CCD, caused by energy transferred to the CCD elements from neighboring CCD elements due to either horizontal spreading of bright long-wavelength signals or the mixing of charges from neighboring elements during transfer of the charges to a shift register. The leakage is the greatest from immediately adjacent neighboring elements, and decreases rather rapidly as the distance increases between the element being read and the neighboring elements contributing to the leakage.

Currently available circuits for enhancing optical imaging of CCD arrays typically endeavor to improve performance of the array, but have traditionally limited signal processing to individual columns of CCD elements. See, for example, U.S. Pat. No. 4,345,148 to Pines, et al. Early efforts to reduce smear occurring during interline charge transfer included generator of a signal pattern representing the smear charge signal pattern present in one line of a field and subsequent subtraction of the signal pattern from the line of charge signals being read, as taught by Levine, U.S. Pat. No. 4,010,319. More current efforts such as suggested by May, U.S. Pat. No. 4,736,439 use pre-processing circuits to obtain median values for a matrix of one or more lines of predetermined pixel neighborhoods, and then subtract the median values read from individual pixels, while Nagumo, U.S. Pat. No. 4,558,366, includes the derivation of signals of "n" horizontal lines from signals of "N" horizontal lines of an image sensing array, where "n" is greater than "N," whereby signals of the "n" horizontal lines lack inherent accumulation of signal components due to picked-up image light and represent only undesirable signal components mixed during vertical transfer of the charge. A compensating circuit reduces the undesirable signal caused by the extraneous undesired signal components. Generally however, such schemes are effective only to compensate for low and high frequency extraneous signal components.

In charge-injection-device (CID) imaging systems, a portion of injected charge moves into laterally adjacent pixels, a phenomenon which increases as the pixels density of the CID imaging system increases. Vogelsong, U.S. Pat. No. 4,768,098 suggests reducing crosstalk in a two-dimensional array of pixels by storing as a first video signal charges sequentially read from each pixels in a row, storing charges read from each pixels in the second row, injecting the charges stored as the first video signal in all of the pixels of the first row, and then sequentially re-reading the stored charge from each of the pixels of the first row as a second video signal. The second video signal is subtracted from first video signal, ostensibly to provide an output signal substantially free of injected cross-talk. Vogelsong '098 denigrates those "techniques which reduce cross-talk effect by mathematically performing cross-talk inversion" as suffering from a drawback requiring knowledge of "the exact amount of cross-talk of each location." Vogelsong, '098, column 1, beginning with line 36.

Other recent circuits such as Ozawa, et al., U.S. Pat. No. 4,543,610 alternately read odd-numbered and even-numbered horizontal rows of picture elements and by subsequent subtraction, endeavor to remove vertical smear attributable to the solid-state imaging elements. Powell, U.S. Pat. No. 4,442,454 combines block overlap transform and a multi-stage procedure using a window moved pixel-by-pixel, row-wise and column-wise over an entire image, and obtains final image values for each pixel by averaging values derived from each of the overlapping windows. Powell U.S. Pat. No. 4,805,031 advocates the grouping of pixel image values corresponding to pixels aligned along predetermined directions, processes groups of pixel image values using a transformed algorithm and a thresholding operation to separate image components from noise components for each of the groups of pixel image values, and repeatedly accumulates and averages image value components from every group. The successive steps however, amount to a correction of earlier corrections which deleteriously multiply, and thereby contaminate previous error corrections, because once the data is subjected to an initial processing, the contamination begins to spread among additional units of data read from other imaging elements. Correction or compensation for contamination after the initial processing is difficult, and with currently available techniques, only approximate. Moreover, spread of contamination during processing prevents reliable correction of sequential smear contamination of image signals.

SUMMARY OF THE INVENTION

It is therefore, an object of the current invention to provide an improved process and circuit for solid state image sensing.

It is another object to provide a process and circuit for enhancing sharpness of final image signals.

It is still another object to provide a process and circuit for reliably attenuating the effects of charge leakage upon final image signals.

It is yet another object to provide a process and circuit for compensating for the effects of the spread of energy from photons impingent upon neighboring photosensitive elements.

It is still yet another object to provide a process and circuit for removing "smearing" from image charge signals read from an array of solid state photosensitive elements.

It is a further object to provide a process and circuit for correcting "smearing" of image charge signals attributable to diagonally proximate elements in an array of solid state photosensitive elements.

It is a still further object to provide a process and circuit amenable to customizing to the fit the characteristics of individual arrays of solid state photosensitive elements.

It is also an object to provide a process and circuit suitable for correcting "smearing" of image charge signals prior to processing of the signals to generate final image signals.

These and other objects are achieved with a finite impulse response filter disposed as a pre-processor immediately after the reading of image charge signals from an array of photosensitive elements, and arranged to filter from the total video information of each photosensitive element a value corresponding to the leakage factor of the respective orthogonally and diagonally contiguous and non-contiguous neighboring elements in proximal rows and columns.

BRIEF DESCRIPTION OF THE DRAWINGS

A more complete appreciation of the inventions, and many of the attendant advantages thereof, will be readily enjoyed as the same becomes better understood by reference to the following detailed description when considered in conjunction with the accompanying drawings in which like members indicate the same or similar components, wherein.

DETAILED DESCRIPTION OF THE INVENTION

Figure 1:
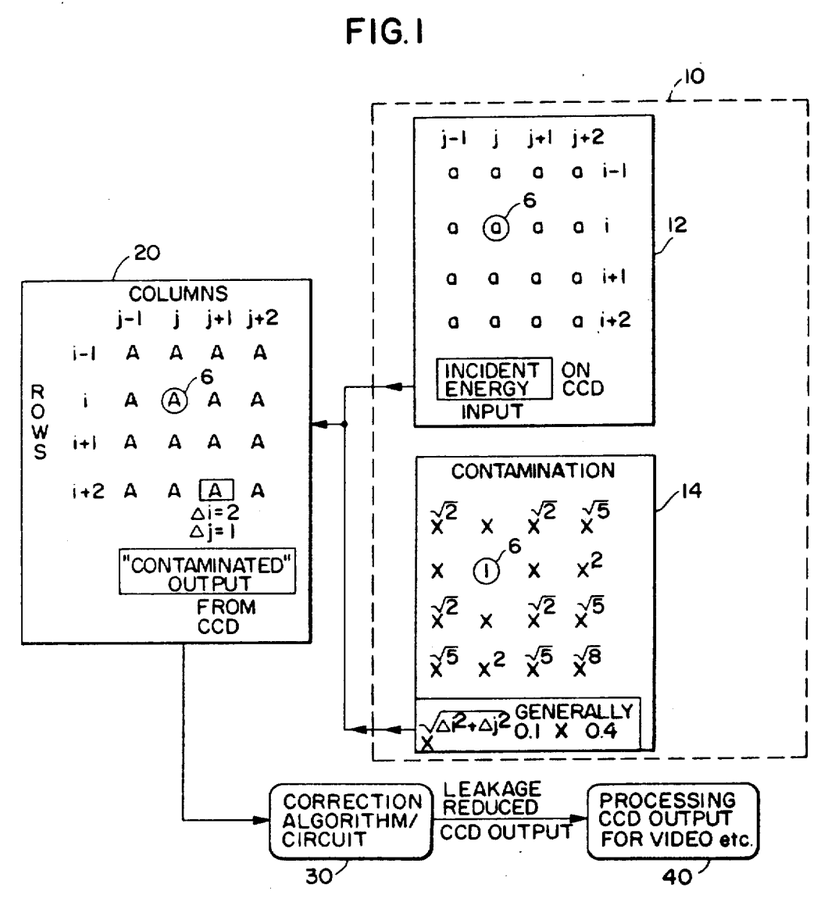
FIG. 1 is a schematic diagram of a circuit for correction of image smear effecting signals read from contiguous photosensitive elements in a two-dimensional array, according to the principles of the current invention.

Referring now to FIG. 1, a schematic diagram illustrates one embodiment of a circuit sequentially receiving electrical charge signals "a" from successive rows of individual photosensitive elements arranged in an array 10 of rows and columns. Although typical devices using such an array 10 of photosensitive elements, include video cameras in which the array may be six hundred and forty rows by four hundred and eighty columns, to simplify the explanation, array 10 is shown as having four rows and four columns of individual CCD elements. A CCD element is a kind of photosensitive element referred in above description. The total energy received by each of the CCD elements is subject to leakage or contamination in the horizontal direction only for a single row of CCD elements. Contamination of data or video information stored in each element in the like of array 10 appears as a smearing of data or the display of the video information from a video camera using CCD as the optical information sensing elements.

When the CCD elements are arranged in a two-dimensional array of rows and columns, the leakage will be from both vertical and diagonal directions, as well as from horizontal directions. The contribution to leakage is at its highest value from the contiguous neighboring elements; leakage decreases rather rapidly as the distance of neighboring elements increases.

Optical information (light) received by individual (discrete) CCD elements in a linear array is contaminated by leakage (about 15 to 25%) from its respective contiguous neighboring CCD elements of the array. The leakage effect may be attributed by all of the adjacent elements in the array with diminishing effect as the elements become more remote. Although the principles of the inventions disclosed contemplate correction of the contributions of remote as well as contiguous CCD elements, for simplification of the description, only the effects of the more proximal horizontally, diagonally and vertically neighboring elements are considered.

The total video information, that is, the contaminated CCD data 20 read from an array 10, includes the primary video information signals 12 imprinted directly on each of the individual elements of photosensitive array 10, plus the proportionality of the leakage or secondary video information signals 14 from the contiguous and non-contiguous neighboring elements. For example, the circled element 6 in row "i" and column "j" may have an image charge of value "a"; assuming that the portion of an object being imaged by the four-by-four element array 10 presents a constant, uniform surface texture to the sixteen elements of the array, the other neighboring elements in rows $i-1$ through $1+2$ and columns $j-1$ through $j+2$ will also have image charges of value "a", as is shown in the matrix for information signals 12 in FIG. 1.

In addition to the image charge read from element 6 however, the contribution of element 6 to the total video information includes contamination attributable to intrinsic imaging error with the normalized value of unity shown in the matrix of contamination signal components 14, and contributions from each of the other elements in the array. As is shown by matrix 14 in FIG. 1, for the abbreviated four-by-four solid state photosensitive array 10 assumed, the values of the contamination signal components attributable to element 6 from its horizontally, diagonally and vertically positioned neighboring elements varies, primarily due to distance, but secondarily due to other factors including intrinsic characteristics of individual one of the neighboring elements. The neighboring elements of element 6 may be described as composed of a first circle including contributions to signal contamination from four horizontally and vertically contiguous elements in rows $j-1$, $j$, $j+1$ and columns $i-1$, $i$, $i+1$; that is $a_{i-1,j}$, $a_{i,j-1}$, $a_{i,j+1}$, $a_{i+1,j}$; a second circle including contributions to signal contamination from four diagonally contiguous elements, that is $a_{i-1,j-1}$, $a_{i-1,j+1}$, $a_{i+1,j-1}$, $a_{i+1,j+1}$; a third circle including contributions to signal contamination from two non-contiguous vertically and horizontally neighboring elements, that is $a_{i,j+2}$, $a_{i+2,j}$; a fourth circle including contributions to signal contamination from four non-contiguous diagonally neighboring elements, that is $a_{i-1,j+2}$, $a_{i+1,j+2}$, $a_{i+2,j-1}$, $a_{i+2,j+1}$; and a fifth circle including contributions to signal contamination from one non-diagonally neighboring element, that is $a_{i+2,j+2}$.

These contributions from neighboring elements to the contaminated data 20 attributed to the signal read by row scanner 24 from element 6, can be reduced towards a minimum by subjecting the total video information to filtering dedicated to attenuate a significant portion of the leakage signal components 14. One way to filter this leakage data is by the use of a finite impulse response (FIR) filter tailored to the leakage factor. The FIR filter is arranged to filter, that is, subtract, from the total video information of each element an amount corresponding to the leakage factor of the respective neighboring elements. Such filtering significantly reduces the smearing effect described above. To illustrate the principle, reference now is made to the FIGS. 1 and 2. If element 6 for example, is the element being considered, the FIR filter is arranged to sequentially (in any order) determine the video data of element 6 and subtract or filter therefrom the video data of elements in one or more of the widening circles of photosensitive elements neighboring element 6, adjusted for the leakage factor.

$$\begin{bmatrix} C_{01} \\ C_{02} \\ C_{03} \\ C_{04} \\ \ldots \end{bmatrix} = \begin{bmatrix} 1 & x & x^2 & x^3 & \ldots \\ x & 1 & x & x^2 & x^3 \\ x^2 & x & 1 & x & x^2 \\ x^3 & x_2 & x & 1 & x \\ x & x^3 & x_2 & x & 1 \end{bmatrix} = \begin{bmatrix} C_{f1} \\ C_{f2} \\ C_{f3} \\ C_{f4} \\ \ldots \end{bmatrix}$$

$$[C_0] = [X][C_f]$$

$$[C_f] = [X]^{-1}[C_0]$$

$$X_{10\%} = 0.15 \text{ to } 0.3$$

where $X < 1$

Figure 2:
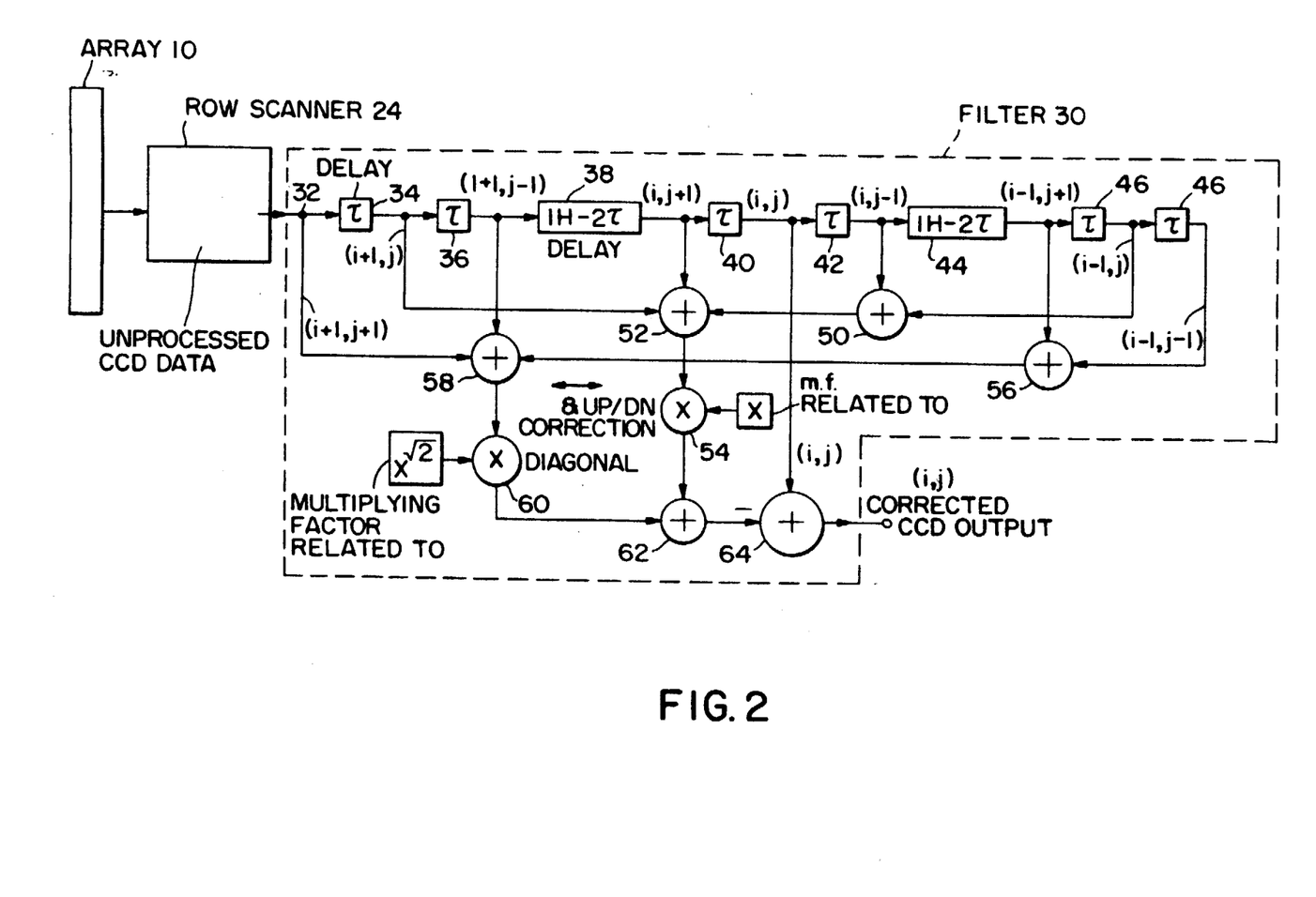
FIG. 2 is a schematic diagram of a circuit for correction of image smear, constructed according to the principles of the current invention.

The image signals A read sequentially from the charges on each of the photosensitive elements in successive rows by row scanner 24 are applied serially to input terminal 32 of filter 30. The input signal is subjected to two $\tau_1$ by elements 34, 36 serially coupled to input node 32. The delay interval $\tau_1$ represents the delay incurred by reading of the charge on one photosensitive element as the charges "clock" out from the CCD elements. The interval H represents the delay incurred between reading the charges on photosensitive elements in the same column, albeit in successive rows.

The signal transmitted by delay element 36 is subjected to a delay of a second period equal to $H - 2\tau_1$ by delay element 38, while the signal transmitted by delay element 38 is subjected to successive delays by intervals of time $\tau_1$, by delay elements 40, 42. The signal transmitted by delay element 42 is then subjected to a delay of an interval $H - 2\tau_1$ by delay element 44 while the signal transmitted by delay element 44 is serially subjected to delays of intervals $\tau_1$ by delay elements 46, 48.

The signals transmitted by delay elements 42, 46 are added by adder 50 to provide a first intermediate signal which is added, by adder 52, to the signals transmitted by delay elements 34, 38, and the sum generated by adder 52 is attenuated by a factor "x" applied by first correction stage 54 to provide a first correction signal. It may be noted that the four signals combined by adders 50, 52 and subjected to attenuation by the first correction stage 54 correspond to the signals sequentially read from the two horizontally contiguous photosensitive elements and from the two vertically contiguous photosensitive elements surrounding element 6, while the correction factor "x" may be measured, or empirically determined for the four photosensitive elements within the first circle.

The signals transmitted by delay elements 44, 48 are added by adder 56 to provide a second intermediate signal, while the second intermediate signal, the signal transmitted by delay element 36 and the signal applied by scanner 24 to input node 32 are added by third adder 58; the sum generated by adder 58 is attenuated by a factor $$\frac{\sqrt{2}}{x}$$

at the second filter stage 60 to provide a second correction signal.

It may be noted that the four signals added by adders 56, 58 and subjected to attenuation at filter stage 60 correspond to the four resulting signals read from charges on the four photosensitive elements diagonally contiguous to element 6. The multiplication factor by which the sum of these four signals are attenuated is related to the greater distance separating those diagonally contiguous elements from photosensitive element 6. As the value of x generally varies between 0.1 and 0.4, the contributions to contamination by those four elements within the second circle is somewhat less than the horizontally and vertically contiguous elements in the first circle.

The first and second correction signals are added by the fifth added 62 to generate accumulative correction signal. The sixth added 64 subtracts the accumulative correction signal from the signal transmitted by the fourth delay element 40 to generate a final image signal for element 6, corrected for contamination attributable to the neighboring elements within the first and second circles. It may be noted that the signal transmitted by delay element 40 corresponds to the uncorrected image signal read from the charge of photosensitive element 6.

The filtering of the contaminated (CCD) video data is preferably, and more simply done prior to further processing of the CCD data. For example, before computing luminance and chrominance information (Y,I & Q or R-Y, B-Y). Moreover, the data processing could include "gamma" correction.

The FIR filter recovers the desired or expected sharpness in the final picture by reducing or essentially eliminating the smearing effect of "leakage."

Although the concept of this invention is described as being embodied in video TV cameras, it will be appreciated and it should be so understood that the principles described above can be used in any array of sensing elements, not limited to CCD elements, where leakage is manifested among adjacent, and more particularly, contiguous sensing elements.

What is claimed is:

1. An information sensing system, comprising;
   a plurality of elements arranged in an ordered array, each of said elements responding to incident radiation by providing resulting signals characteristic of said incident radiation; and
   means coupled to receive said resulting signals, for attenuating contributions to each of said resulting signals by said radiation incident upon first ones of said elements next adjacent to each corresponding one of said elements and by said radiation incident upon second ones of said elements diagonally adjacent to each corresponding one of said elements, to provide an adjusted image signal for each corresponding one of said elements.

2. The information sensing circuit of claim 1, wherein said attenuating means comprises:
   input means coupled for receiving said resulting signals;
   first means for delaying said resulting signals by a first period, coupled to said input means:
   second means for delaying said resulting signals by said first period, coupled to said first delaying means;
   third means for delaying said resulting signals by a second period, coupled to said second delaying means;
   fourth means for delaying said resulting signals by said first period, coupled to said third delaying means;

fifth means for delaying said resulting signals by said first period, coupled to said fourth delaying means;

sixth means for delaying said resulting signals by said second period, coupled to said fifth delaying means;

seventh means for delaying said resulting signals by said first period, coupled to said sixth delaying means;

first means coupled for adding signals transmitted by said fifth and seventh delaying means, to provide first intermediate signals;

second means coupled for adding said first intermediate signals to signals transmitted by said first and third delaying means, to provide second intermediate signals;

first means for multiplying said second intermediate signals by a first factor, to provide, to provide first correction signals; and means coupled for subtracting said first correctional signals from signals transmitted by said fourth delaying means.

3. The information sensing circuit of claim 2, wherein said attenuating means comprises:

eighth means for delaying said resulting signals by said first period, coupled to said seventh delaying means;

third means coupled for adding signals transmitted by said sixth and eighth delaying means, to provide third intermediate signals;

fourth means coupled for adding said third intermediate signals to signals received by said input means and signals transmitted by said second delaying means, to provide fourth intermediate signals;

second means for multiplying said fourth intermediate signals by a second factor, to provide second correction signals; and fifth means coupled between said subtracting means and said first and second multiplying means, for adding said first and second correction signals, whereby said subtracting means subtracts and first and second correction signals from said signal transmitted by said fourth delaying means.

4. The information sensing system of claim 1, wherein said attenuating means comprises:

input means coupled for receiving said resulting signals;

first means for delaying said resulting signals by a first period, coupled to said input means;

second means for delaying said resulting signals by said first period, coupled to said first delaying means;

third means for delaying said resulting signals by a second period, coupled to said second delaying means;

fourth means for delaying said resulting signals by said first period, coupled to said third delaying means;

fifth means for delaying said resulting signals by said first period, coupled to said fourth delaying means;

sixth means for delaying said resulting signals by said second period, coupled to said fifth delaying means;

seventh means for delaying said resulting signals by said first period, coupled to said sixth delaying means;

eighth means for delaying said resulting signals by said first period, coupled to said seventh delaying means;

first means coupled for adding signals transmitted by said sixth and eighth delaying means, to provide first intermediate signals;

second means coupled for adding signals transmitted by said fifth and seventh delaying means, to provide second intermediate signals;

third means coupled for adding said first intermediate signals to signals received by said input means and signals transmitted by said second delaying means, to provide third intermediate signals;

fourth means coupled for adding said second intermediate signals to signals transmitted by said first and third delaying means, to provide fourth intermediate signals;

first means for multiplying said third intermediate signals by a first factor, to provide fifth intermediate signals;

second means for multiplying said fourth intermediate signals by a second factor, to provide sixth intermediate signals;

fifth means coupled for adding said fifth and sixth intermediate signals, to provide correction signals; and means coupled for subtracting said correctional signals from signals transmitted by said fourth delaying means.

5. The information sensing system of claim 1, wherein said plurality of elements are arranged in an ordered array of rows and columns, said attenuating means comprising:

input means coupled for receiving said resulting signals;

first means for delaying said resulting signals by a first period, coupled to said input means;

second means for delaying said resulting signals by said first period, coupled to said first delaying means;

third means for delaying said resulting signals by a second period, coupled to said second delaying means;

fourth means for delaying said resulting signals by said first period, coupled to said third delaying means;

fifth means for delaying said resulting signals by said first period, coupled to said fourth delaying means;

sixth means for delaying said resulting signals by said second period, coupled to said fifth delaying means;

seventh means for delaying said resulting signals by said first period, coupled to said sixth delaying means;

said delaying means being serially connected in an order of said first, second, third, fourth, fifth, sixth and seventh delaying means;

first means coupled for adding signals transmitted by said fifth and seventh delaying means, to provide first intermediate signals;

second means coupled for adding said first intermediate signals to signals transmitted by said first and third delaying means, to provide second intermediate signals;

first means for multiplying said second intermediate signals by a first factor, to provide, to provide first correction signals; and means coupled for subtracting said first correctional signals from signals transmitted by said fourth delaying means.

6. The information sensing circuit of claim 5, wherein said resulting signals are successively read from each of said elements during intervals of time equal to said first period, and said resulting signals are read from all elements in each row during intervals of time equal to said second period.

7. The information sensing system of claim 5, wherein said plurality of elements are arranged in an ordered array of rows and columns, said attenuating means comprising:
- eighth means serially connected to said seventh delaying means, for delaying said resulting signals by said first period, coupled to said seventh delaying means;
- third means coupled for adding signals transmitted by said sixth and eighth delaying means, to provide third intermediate signals;
- fourth means coupled for adding said third intermediate signals to signals received by said input means and signals transmitted by said second delaying means, to provide fourth intermediate signals;
- second means for multiplying said fourth intermediate signals by a second factor, to provide second correction signals; and
- fifth means coupled between said subtracting means and said first and second multiplying means, for adding said first and second correction signals, whereby said subtracting means subtracts and first and second correction signals from said signal transmitted by said fourth delaying means.

8. The information sensing circuit of claim 7, wherein said resulting signals are successively read from each of said elements during intervals of time equal to said first period, and said resulting signals are read from all elements in each row during intervals of time equal to said second period.

9. The information sensing system of claim 1, wherein said plurality of elements are arranged in an ordered array of rows and columns, said attenuating means comprising:
- input means coupled for receiving said resulting signals;
- first means for delaying said resulting signals by a first period, coupled to said input means;
- second means for delaying said resulting signals by said first period, coupled to said first delaying means;
- third means for delaying said resulting signals by a second period, coupled to said second delaying means;
- fourth means for delaying said resulting signals by said first period, coupled to said third delaying means;
- fifth means for delaying said resulting signals by said first period, coupled to said fourth delaying means;
- sixth means for delaying said resulting signals by said second period, coupled to said fifth delaying means;
- seventh means for delaying said resulting signals by said first period, coupled to said sixth delaying means;
- eighth means for delaying said resulting signals by said first period, coupled to said seventh delaying means;
- said delaying means being serially connected in an order of said first, second, third, fourth, fifth, sixth, seventh and eighth delaying means;
- first means coupled for adding signals transmitted by said sixth and eighth delaying means, to provide first intermediate signals;
- second means coupled for adding signals transmitted by said fifth and seventh delaying means, to provide second intermediate signals;
- third means coupled for adding said first intermediate signals to signals received by said input means and signals transmitted by said second delaying means, to provide third intermediate signals;
- fourth means coupled for adding said second intermediate signals to signals transmitted by said first and third delaying means, to provide fourth intermediate signals;
- first means for multiplying said third intermediate signals by a first factor, to provide fifth intermediate signals;
- second means for multiplying said fourth intermediate signals by a second factor, to provide sixth intermediate signals;
- fifth means coupled for adding said fifth and sixth intermediate signals, to provide correction signals; and
- means coupled for subtracting said correctional signals from signals transmitted by said fourth delaying means.

10. The information sensing circuit of claim 9, wherein said resulting signals are successively read from each of said elements during intervals of time equal to said first period, and said resulting signals are read from all elements in each row during intervals of time equal to said second period.

11. An information sensing system, comprising:
- means connectable for receiving resulting signals read from each of a plurality of elements arranged in an ordered array to provide said resulting signals in response to radiation incident upon the array of elements;
- first means for delaying said resulting signals by a first period, coupled to said receiving means;
- second means for delaying said resulting signals by said first period, coupled to said first delaying means;
- third means for delaying said resulting signals by a second period, coupled to said second delaying means;
- fourth means for delaying said resulting signals by said first period, coupled to said third delaying means;
- fifth means or delaying said resulting signals by said first period, coupled to said fourth delaying means;
- sixth means for delaying said resulting signals by said second period, coupled to said fifth delaying means;
- seventh means for delaying said resulting signals by said first period, coupled to said sixth delaying means;
- first means coupled for adding signals transmitted by said fifth and seventh delaying means, to provide first intermediate signals;
- second means coupled for adding said first intermediate signals to signals transmitted by said first and third delaying means, to provide second intermediate signals;
- first means for multiplying said second intermediate signals by a first factor, to provide first correction signals; and means coupled for subtracting said first correctional signals from signals transmitted by said delaying means.

12. The information sensing circuit of claim 11, further comprising:
    eighth means for delaying said resulting signals by said first period, coupled to said seventh delaying means;
    third means coupled for adding signals transmitted by said sixth and eight delaying means, to provide third intermediate signals;
    fourth means coupled for adding said third intermediate signals to signals received by said input means and signals transmitted by said second delaying means, to provide fourth intermediate signals;
    second means for multiplying said fourth intermediate signals by a second factor, to provide second correction signals; and
    fifth means coupled between said subtracting means and said first and second multiplying means, for adding said first and second correction signals, whereby said subtracting means subtracts and first and second correction signals from said signal transmitted by said fourth delaying means.

13. The information sensing circuit of claim 11, wherein said receiving means comprising, means for successively reading said resulting signals from each of the elements during intervals of time equal to said first period, and for reading said resulting signals from all of the elements in each row during intervals of time equal to said second period.

14. The information sensing circuit of claim 12, wherein said receiving means comprising, means for successively reading said resulting signals from each of the elements during intervals of time equal to said first period, and for reading said resulting signals from all of the elements in each row during intervals of time equal to said second period.

* * * * *

UNITED STATES PATENT AND TRADEMARK OFFICE
CERTIFICATE OF CORRECTION

PATENT NO. : 5,053,615
DATED : October 1, 1991
INVENTOR(S) : Chandrakant B. Patel It is certified that error appears in the above-indentified patent and that said Letters Patent is hereby corrected as shown below:

| | | |
|---|---|---|
| Column 1 | Line 22, | after "energy", change "impingement" to --impingent--; |
| | Line 38, | after "included", change "generator" to --generation--; |
| Column 4 | Line 32, | after "individual", change "one" to --ones--: |
| Column 10 | Line 51, | after "fifth means", change "or" to --for--; |

UNITED STATES PATENT AND TRADEMARK OFFICE
CERTIFICATE OF CORRECTION

PATENT NO. : 5,053,615
DATED : October 1, 1991
INVENTOR(S) : Chandrakant B. Patel It is certified that error appears in the above-indentified patent and that said Letters Patent is hereby corrected as shown below:

Column 11, line 10, preceding "delaying", change "eight" to --eighth--.

Signed and Sealed this

Twelfth Day of September, 1995

Attest:

BRUCE LEHMAN

Attesting Officer

Commissioner of Patents and Trademarks